United States Patent [19]

Matikainen et al.

[11] 4,111,065

[45] Sep. 5, 1978

[54] ROLL AND ROLL-DRIVING ASSEMBLY

[75] Inventors: Martti Matikainen, Pori; Matti Sivonen, Jyväskylä, both of Finland

[73] Assignee: Valmet Oy, Finland

[21] Appl. No.: 794,075

[22] Filed: May 5, 1977

[30] Foreign Application Priority Data

May 6, 1976 [FI] Finland ................................ 761280

[51] Int. Cl.² ............................................ F16H 57/00
[52] U.S. Cl. ...................................................... 74/410
[58] Field of Search ................ 74/801, 410, 411, 409

[56] References Cited

U.S. PATENT DOCUMENTS

| | | | |
|---|---|---|---|
| 3,021,731 | 2/1962 | Stoeckicht | 74/801 |
| 3,434,374 | 3/1969 | Barwig et al. | 74/410 X |

Primary Examiner—Leonard H. Gerin
Attorney, Agent, or Firm—Steinberg & Blake

[57] ABSTRACT

A roll and roll-driving assembly includes an internal stationary shaft and an outer shell surrounding the internal shaft as well as a bearing structure supporting the outer shell for rotation with respect to the internal shaft. A rotary input shaft is coaxial with the stationary shaft to receive a rotary drive from an outside source. A sun gear is fixed coaxially to the rotary input shaft so as to rotate therewith, while a plurality of planetary gears which respectively have axes parallel to the axis of the input shaft and which mesh with the sun gear are uniformly distributed about the axis of the input shaft. An internal ring gear surrounds and meshes with the planetary gears while being supported exclusively thereby so that the internal ring gear can automatically center itself with respect to the plurality of planetary gears while a load is uniformly distributed along a plurality of power-transmission paths extending from the sun gear through the plurality of planetary gears to the internal ring gear. A transmission is operatively connected between the internal ring gear and the shell to transmit a drive from the ring gear to the shell and to automatically compensate for inaccuracies and/or deformations.

8 Claims, 3 Drawing Figures

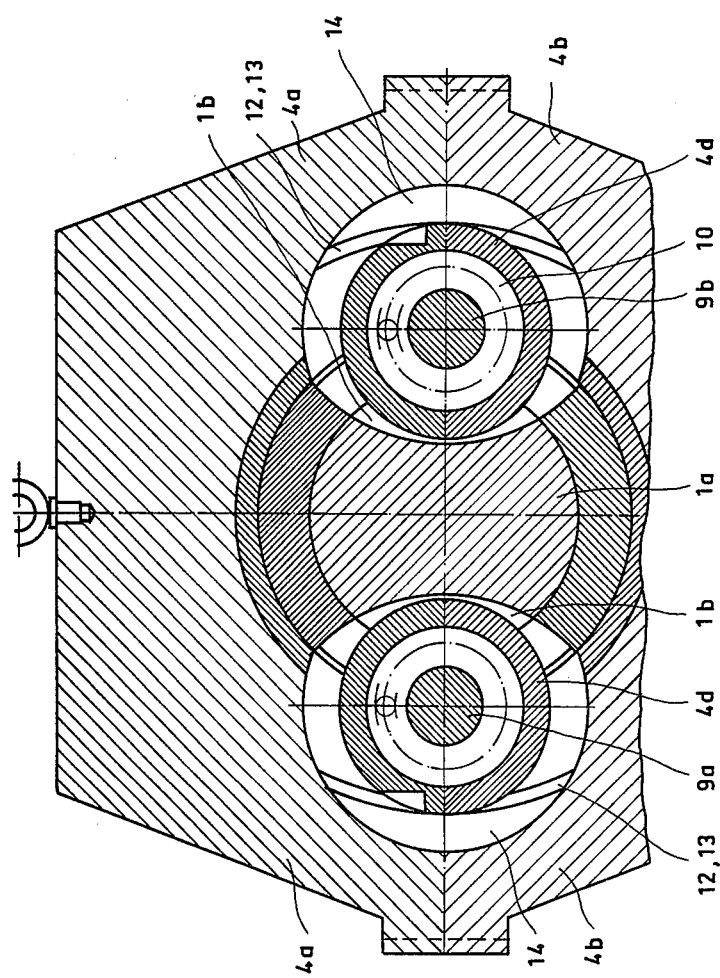

ROLL AND ROLL-DRIVING ASSEMBLY

BACKGROUND OF THE INVENTION

The present invention relates to roll and roll-driving assemblies.

In particular, the present invention relates to that type of roll structure where an internal shaft is surrounded by a rotary shell while a drive is transmitted to the rotary shell from an input shaft which is coaxial therewith. Thus, through a suitable gear transmission a drive from the input shaft is transmitted to the shell so as to rotate the latter with respect to the stationary shaft. Several different types of drives of the above general type are known. Thus, according to one known structure there is a three-ring bearing including a pair of spherical roller bearings with a ring disposed therebetween and utilized to conduct the rotation to the shell by way of rigid connections from a shaft to the shell. Angular displacements between the axis of the roll assembly and the shell are compensated at the spherical bearing structure. The disadvantage of this type of construction resides in the fact that it has a large radial space requirement which inhibits the possibility of utilizing a three-ring bearing which is of a sufficient size. Thus with this type of construction it is essential to utilize a bearing which is too small, with the result that the bearing has only a short operating life.

A further type of known drive utilizing a three-ring bearing arrangement has been provided with one cylindrical and one spherical roller bearing, the ring between them being utilized to conduct the rotary motion to the shell by way of a double-tooth coupling from an input shaft. This double-tooth coupling has curved teeth which permit a slight angular displacement between the central axis of the roll and the housing of the bearing. However, this known drive suffers from the same drawback as the above-referred to known construction, namely, the impossibility of using a large enough bearing structure because of the space requirements.

It has also been proposed to provide on at least one of a pair of opposed side shafts which are parallel to the drive shaft a pair of traction wheels one of which meshes with the driving gear on the drive shaft while the other meshes with an extremely toothed ring. When the drive shaft of this construction is rigidly mounted in bearings, the above side shaft is disposed obliquely with respect to the axis of a flange of the structure in such a way that when a predetermined radial load is applied to the shell the flange axis and the side shaft axis will become parallel to each other. With this type of construction it is possible to transmit the power only along one path from the input shaft to the rotary shell. Such a construction has a single-pivot bearing structure so that of necessity there will be an uneven, rough operation if the shell is displaced with respect to the drive. In addition, the gear which drives the shell can only accept limited loads because the teeth of this gear are always urged to one side. Moreover, since the entire driving structure is situated outside of the roll, there are large space requirements.

A second possible alternative with this type of construction resides in transmitting the power along two paths from the input shaft to the shell, with this construction being based upon a two-pivot support and a symmetrical load application. However, this construction suffers from the drawback that equal distribution of the loads among both of the power transfer paths cannot be reliably achieved because of unavoidable inaccuracies in the manufacturing of the components utilized in the transmission.

According to a third possible alternative of the above type of construction the power is transmitted along three paths from the input shaft to the shell. However, this construction also is based upon a two-pivot supporting arrangement with the supporting of the gear which drives the shell being deficient in the same way as in the above two alternatives. Furthermore, equal distribution of power among the three power transfer paths cannot be reliably achieved because of the inaccuracies in the manufacture of the transmission components. A further drawback of such a construction resides in the fact that the oblique position of the side shaft is preliminarily determined to achieve a parallel relationship only when a certain load is applied, so that a serious restriction is placed on the possibility of varying the load, or in other words the line-pressure loading of the shell.

SUMMARY OF THE INVENTION

It is accordingly a primary object of the present invention to provide a roll and roll-driving assembly of the above general type which will avoid the above drawbacks.

In particular, it is an object of the present invention to provide a construction where there are also side shafts of the type referred to above, which may be planetary gears of a planetary gear transmission, with these side shafts transmitting power through transmission structure of the invention in such a way that a substantially equal distribution of the load among a plurality of power transfer paths is achieved while at the same time there is a compensation for inaccuracies in assembling the components or in the components themselves as well as for deformations which may occur during operation, in such a way that these latter factors have no undesirable influence on the transmission of power to the rotary shell.

In addition, it is an object of the present invention to provide a construction of the above general type which will have only small space requirements.

In particular, it is an object of the invention to provide a construction where the drive means can be made smaller than the outer diameter of the shell.

Thus, with these small space requirements of the invention, it is an object of the present invention to provide a drive according to which it is possible to utilize the invention in designs where it is essential to place close to each other a number of rolls such as, for example, of the type which are adjustable with respect to their deflection.

In addition, it is an object of the present invention to provide a construction according to which the drive means may have attached thereto in a convenient manner other pieces of equipment such as, for example, doctor blades.

It is yet another object of the present invention to provide a construction according to which the necessity of machining recesses to accommodate components is minimized so as to reduce in this way to a minumum the extent to which the strength of components is reduced by such recesses.

Furthermore it is an object of the present invention to provide a construction which is easy to mount as well as easy to disassemble so as to facilitate in this way servicing operations.

According to the invention the roll and roll-driving assembly includes an internal stationary shaft means and an outer shell which surounds the internal stationary shaft means as well as bearing means which supports the outer shell for rotation with respect to the internal stationary shaft means. A rotary input shaft means is coaxial with the stationary shaft means to receive a rotary drive from an outside source. A sun gear means is fixed coaxially to the rotary input shaft means for rotation therewith. A plurality of planetary gear means respectively have axes parallel to the axis of the input shaft means and mesh with the sun gear means while being uniformly distributed about the axis of the input shaft means. An internal ring gear of the invention surrounds and meshes with the planetary gear means while being supported exclusively by the planetary gear means so that the internal ring gear is capable of automatically centering itself with respect to the plurality of planetary gear means with a load being uniformly distributed along a plurality of power-transmission paths extending from the sun gear means through the plurality of planetary gear means to the internal ring gear. A transmission means is operatively connected to the internal ring gear and to the shell to transmit a drive from the ring gear to the shell and to automatically compensate for inaccuracies and/or deformations.

BRIEF DESCRIPTION OF DRAWINGS

The invention is illustrated by way of example in the accompanying drawings which form part of the application and in which:

FIG. 3 is a fragmentary transverse sectional elevation of the structure of FIGS. 1 and 2, taken along line III—III of FIG. 2.

DESCRIPTION OF A PREFERRED EMBODIMENT

The rolls which form part of the structure of the invention are of the type which have an outer driven shell, such rolls being, for example, suction rolls and rolls which are adjustable with respect to their deflection, the latter type of rolls being, for example, so-called Kusters rolls and CC rolls, as are commonly used in paper-manufacturing machines.

Figure 1:
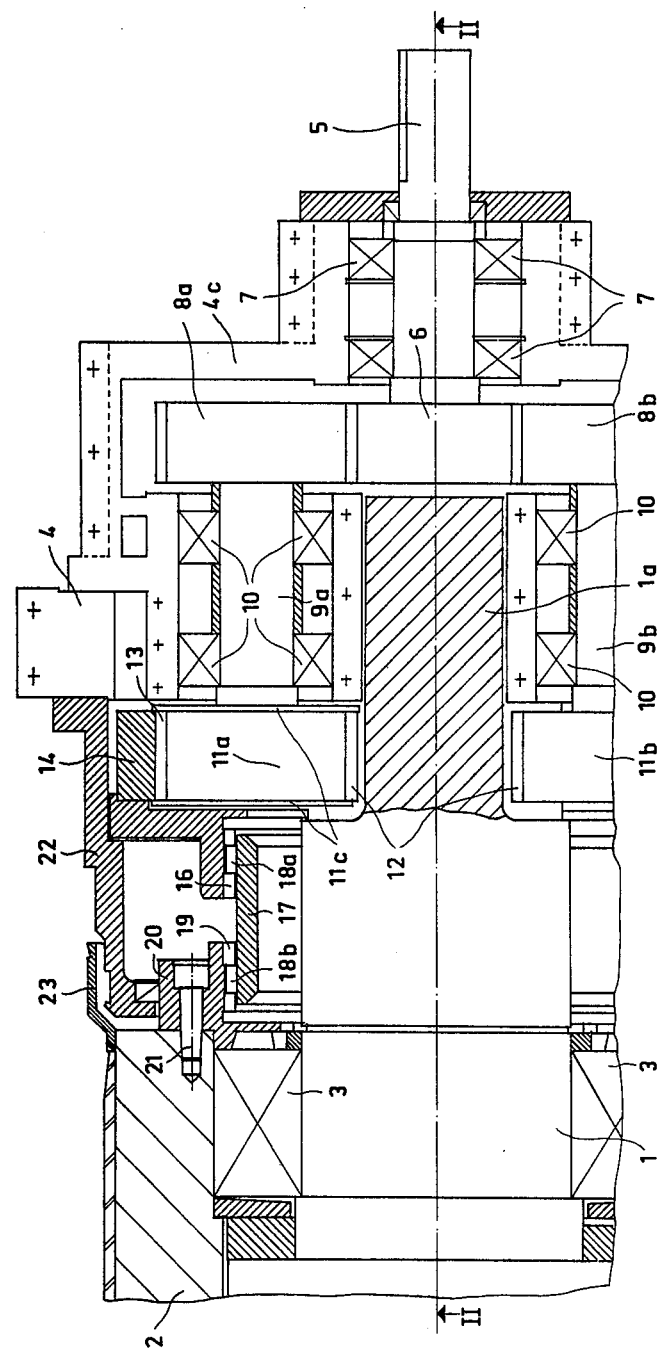
FIG. 1 is a fragmentary sectional plan view of one possible structure according to the invention, the section of FIG. 1 being taken along line I—I of FIG. 2 in the direction of the arrows.
Figure 2:
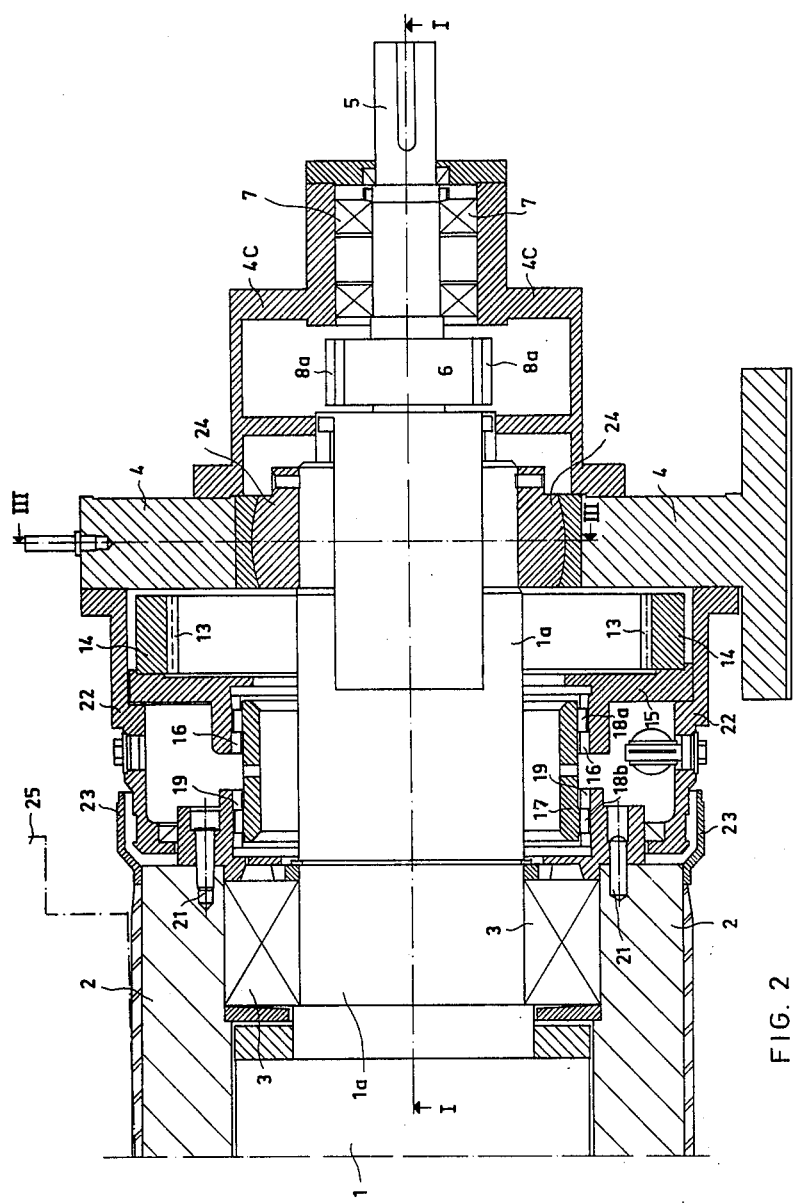
FIG. 2 is a fragmentary sectional elevation of the structure of FIG. 1, taken along line II—II of FIG. 1.

FIGS. 1–3 illustrate the end region of such a roll. Thus, the illustrated roll has an outer cylindrical rotary shell 2 which coaxially surrounds a massive stationary (non-rotating) internal shaft means or axle 1. The latter internal stationary shaft means 1 extends axially beyond the outer shell 2 and carries a bearing means 3 which serves to support the outer shell 2 for rotation with respect to the internal stationary shaft means 1. In the event that the roll is of the type which is an adjustable deflection roll, special control means are utilized to obtain a line pressure of desired configuration, most frequently a uniform line pressure, between the roll shell 2 and its mating roll 25 which is schematically indicated by way of a phantom line at the upper left of FIG. 2.

The internal stationary shaft means 1 has a pair of opposed elongated end portions 1a, one of which is illustrated, and these ends 1a of the internal stationary shaft means 1 are supported by way of a frame means 4 in the form of a suitable stand which is carried by the frame structure of the paper machine or the equivalent thereof. More specifically, each end 1a of the stationary shaft means 1 is supported at the frame means 4 by way of a bearing means 24 having a spherical bearing surface permitting the ends 1a of the shaft 1 to tilt with respect to the frame means 4 when the shaft 1 is deflected under load.

As illustrated in the drawings, at the illustrated end 1a of the internal shaft means 1 there is a drive means of the invention serving to rotate the outer shell 2 with respect to the internal stationary shaft means 1. This drive means includes an input shaft means 5 which is coaxial with the shaft 1. This input shaft means 5 is adapted to be rotated from an outside source, the structure which rotates the input shaft means 5 in itself being known and thus not illustrated.

The drive of the invention is a planetary gear type of drive. Thus, the frame means 4 includes a housing portion 4c in the form of a sleeve-like projecting part of the frame means, and this housing portion 4c accommodates part of the input shaft means 5 which is supported for rotation at the housing portion 4c by way of the bearing means 7. At its inner end the rotary input shaft means 5 fixedly carries a sun gear 6 corresponding to the sun wheel of a planetary gear transmission. The external teeth of the sun gear 6 are in mesh with a pair of diametrically opposed planetary gears 8a and 8b which thus form part of a plurality of planetary gear means which respectively have axes parallel to the axis of the input shaft means 5 and which are uniformly distributed about the latter axis. These gears 8a and 8b thus form part of a pair of planetary gear means which include the side shafts 9a and 9b respectively fixed to and extending from the planetary gears 8a and 8b while having their axes parallel to the common axis of the input shaft 5 and the internal stationary shaft 1. The pair of diametrically opposed side shafts 9a and 9b are supported for rotary movement by way of a pair of bearing means 10 which are carried by the frame means 4.

The pair of planetary gear means include not only the planetary gears 8a and 8b and the side shafts 9a and 9b respectively fixed to and extending therefrom, but also a pair of gears 11a and 11b which are respectively fixed coaxially to the side shafts 9a and 9b at the ends thereof distant from the gears 8a and 8b. As is shown most clearly in FIG. 3, in order to minimize the space requirements, in particular the space required by the gears 11a and 11b and the bearings for the side shafts, recesses 1b are machined in the internal stationary shaft means 1 at opposite sides thereof, so that there is sufficient room for each bearing sleeve 4d which is fixed to the frame means 4, the arrangement being such that there remains between the sleeves 4d and the internal stationary shaft means 1, particularly its portion 1a, a gap which is sufficient to afford deflection of the internal shaft means 1 under load without engagement between the shaft means 1 and the sleeves 4d. As is also apparent from FIG. 3, the frame means 4 includes an upper component 4a and a lower component 4b which are fixed to each other by way of suitable screws.

According to a particular feature of the invention, the gears 11a and 11b of the pair of planetary gear means mesh with the internal teeth 13 of an internal ring gear 14 which circumferentially surrounds and meshes with the gears 11a and 11b of the pair of planetary gear means. This internal ring gear 14 is supported exclusively by the gears 11a and 11b. Thus, FIGS. 1 and 2 show how the internal ring gear 14 meshes with the teeth 12 of the gears 11a and 11b while being supported exclusively thereby. Thus it will be seen that with this construction the power is transmitted uniformly along a pair of paths extending from the input shaft means 5 through the pair of planetary gear means to the internal ring gear 14.

A transmission means of the invention is operatively connected between the internal ring gear 14 and the shell 2 for transmitting rotation from the gear 14 to the shell 2 as well as for compensating automatically for inaccuracies and/or deformation. This transmission means includes a flange 15 fixed to the ring gear 14 while projecting radially from an internal ring gear 16 which forms part of the transmission means. This transmission means also includes a flange fixed by way of elements 21 to the shell 2 and projecting radially from a second internal ring gear 19. The pair of internal ring gears 16 and 19 are respectively situated at a pair of locations of the transmission means and form at each of these locations one of a pair of components of the transmission means which affords the possibility of tilting with respect to the common axis of the input shaft 5 and the stationary shaft 1. The other pair of components of the transmission means respectively situated at the locations thereof where the ring gears 16 and 19 are located are formed by the teeth 18a and 18b which are fixed to and project from a coupling sleeve 17 which extends between the above locations of the transmission means and which coaxially surrounds the portion 1a of the internal shaft means 1 with clearance as illustrated. Thus, the teeth 18a form a relatively short tooth portion at an outer circumferential region of the coupling sleeve 17 which also carries the external teeth 18b which mesh with the teeth of the internal ring gear 19 fixed by way of the flange projecting therefrom to the sleeve 2 by way of the screws 21.

The housing portion of the frame means 4 includes not only the part 4c but also an elongated sleeve portion 22 which extends up to the shell 2 in close proximity thereto and which serves to house the ring gear 14 and the above-described transmission means extending between the ring gear 14 and the shell 2. The shell 2 fixedly carries at its end adjacent to the housing portion 22 an outer annular portion 23 in the form of a ring or sleeve which overlaps the housing portion 22 with clearance as illustrated. Thus, the shell 2 is provided with the illustrated protective sleeve 23 which with clearance surrounds an end portion of the protective sleeve 22 of the frame means 4.

Each of the gears 11a and 11b fixedly carries at its opposed end faces a pair of guide rings 11c receiving an inner circumferential portion of the internal ring gear 14, including the teeth 13 thereof, so that in this way the gear 14 is maintained axially in alignment with the gears 11a and 11b. If desired only one of the gears 11a and 11b may be provided with the stop or guide rings 11c.

Thus, with the above-described transmission means it is possible for pivoting or tilting movement to take place on the one hand at the location of the internal ring gear 16 where the latter meshes with the teeth 18a and on the other hand at the location of the internal ring gear 19 where the latter meshes with the teeth 18b. Thus these components form in the path of power transmission a two-pivot connection capable of automatically compensating for errors in the position of the components or inaccuracies in the manufacture thereof as well as for deformations which may occur during operation. However, while such compensation is automatically provided by way the structure of the invention it will be seen that this compensating structure does not in any way interfere with the efficient transmission of power to the shell 2. Instead of a two-pivot type of coupling sleeve as described above and shown in the drawings it is possible in some cases to use a single-pivot coupling member such as, for example, a spring-sleeve type of coupling which in itself is known.

Of course, the invention is not necessarily confined to the details presented above. For example, instead of a pair of planetary gear means, each including a side shaft 9a, 9b and a pair of gears 8a, 8b and 11a, 11b, it is possible to provide more than two planetary gear means. However, it is desirable that the plurality of planetary gear means, irrespective of the particular number thereof, be uniformly distributed about the axis of the shaft 1.

In the claims which follow the scope of the inventive concept is defined with the possibility of different details of the invention varying while being included within this scope of the inventive concept.

What is claimed is:

1. In a roll and roll-driving assembly, internal stationary shaft means, an outer shell surrounding said internal stationary shaft means and bearing means supporting said outer shell for rotation with respect to said internal stationary shaft means, rotary input shaft means coaxial with said stationary shaft means for receiving a rotary drive from an outside source, sun gear means fixed coaxially to said rotary input shaft means for rotation therewith, a plurality of planetary gear means respectively having axes parallel to the axis of said input shaft means and meshing with said sun gear means while being uniformly distributed about the axis of said input shaft means, an internal ring gear surrounding and meshing with said planetary gear means while being supported exclusively by said planetary gear means so that said internal ring gear is capable of automatically centering itself with respect to said plurality of planetary gear means with a load being uniformly distributed along a plurality of power-transmission paths extending from said sun gear means through said plurality of planetary gear means to said internal ring gear, and transmission means operatively connected to said internal ring gear and to said shell for transmitting a drive from said ring gear to said shell and for automatically compensating for inaccuracies and/or deformations.

2. The combination of claim 1 and wherein said transmission means includes a pair of locations spaced from each other along the common axis of said stationary shaft means and input shaft means and at each of said locations a pair of transmission components capable of tilting one with respect to the other and with respect to said common axis while continuing the transmission of the drive from said internal ring gear to said shell.

3. The combination of claim 2 and wherein said transmission means includes at said locations, respectively, a pair of internal ring gears one of which is fixed to said first-mentioned ring gear for rotation therewith and the other of which is fixed to said shell, with the latter pair of internal ring gears each forming one of said components at each location of said transmission means, and said transmission means further including an elongated sleeve extending between said locations and fixedly carrying exterior teeth which mesh with said pair of internal ring gears at said locations with said teeth of said sleeve forming the other of said components at each of said locations of said transmission means.

4. The combination of claim 1 and wherein said internal ring gear has a diameter substantially equal to the diameter of said shell.

5. The combinaton of claim 1 and wherein said stationary shaft means is formed with a plurality of recesses into which said plurality of planetary gear means respectively extend while providing for said stationary shaft means sufficient clearance for deflection of said stationary shaft means under load without interfering with the transmission of the drive from said input shaft means to said shell.

6. The combination of claim 3 and wherein said sleeve is supported exclusively by said pair of internal ring gears while coaxially surrounding said stationary shaft means with clearance.

7. The combination of claim 6 and wherein said transmission means includes a pair of flanges respectively fixed to and projecting radially from said pair of internal ring gears which are respectively situated at said locations of said transmission means, said pair of flanges being respectively fixed to said first-mentioned ring gear and to said shell.

8. The combination of claim 1 and wherein a frame means supports said stationary shaft means and carries bearing means which support said input shaft means for rotation and which support said pair of planetary gear means for rotation, said frame means including a housing portion for accommodating part of said input shaft means together with said bearing means which support the same for rotation as well as said sun gear means, planetary gear means, internal ring gear and transmission means, and said shell having at one end an annular portion which surrounds said housing portion of said frame means with clearance.

* * * * *